United States Patent [19]

Worthington et al.

[11] Patent Number: 4,490,336

[45] Date of Patent: Dec. 25, 1984

[54] PROCESS FOR STRIPPING URANIUM FROM AN ALKYL PYROPHOSPHORIC ACID

[75] Inventors: Ralph E. Worthington, Winter Haven; Alex Magdics, Lakeland, both of Fla.

[73] Assignee: Prodeco, Inc., Mulberry, Fla.

[21] Appl. No.: 267,473

[22] Filed: May 27, 1981

[51] Int. Cl.³ .............................................. C01G 43/00
[52] U.S. Cl. .......................................... 423/10; 423/8; 423/11; 423/139; 423/260; 423/321 S
[58] Field of Search ................. 423/3, 10, 8, 260, 139, 423/11, 321 S

[56] References Cited

U.S. PATENT DOCUMENTS

| | | | |
|---|---|---|---|
| 2,859,094 | 11/1958 | Schmitt et al. | 23/14.5 |
| 2,866,680 | 12/1958 | Long | 23/14.5 |
| 2,882,123 | 4/1959 | Long | 23/14.5 |
| 2,947,774 | 8/1960 | Levine et al. | 260/461 |
| 2,982,600 | 5/1961 | Vogler et al. | 423/10 |
| 4,108,957 | 8/1978 | Michel | 423/3 |
| 4,162,230 | 7/1979 | Horwitz et al. | 423/10 |
| 4,428,910 | 1/1984 | Worthington et al. | 423/10 |

FOREIGN PATENT DOCUMENTS

| | | |
|---|---|---|
| 2423545 | 11/1979 | France . |
| 2435444 | 4/1980 | France . |
| 2013643 | 8/1979 | United Kingdom . |

OTHER PUBLICATIONS

Ellis, D. A., "The Recovery of Uranium From Industrial Phosphoric Acids by Solvent Extraction", DOW-81, 1952.

Zangen, "The Composition of 'OPPA'", *Journal of Inorganic and Nuclear Chemistry*, vol. 16, 1960/61, pp. 165-166.

Zangen et al., "Products of the Reaction Between Alcohols and Phosphorus Pentoxide—Identification by Infrared Spectrophotometry", *Israel Journal of Chemistry*, vol. 5, 1967, pp. 89-100.

Zangen et al., "Product of the Reaction Between Alcohols and Phosphorus Pentoxide: I. Identity and Extractant Efficiency of the Various Products", *Separation Science*, vol. 2, 1967, pp. 187-197.

Zangen et al., "Products of the Reaction Between Alcohols and Phosphorus Pentoxide: II. Chromatographic Separation of the Products", *Separation Science*, vol. 3, 1968, pp. 1-9.

Long et al., "Recovery of Uranium from Phosphates by Solvent Extraction", *Proc. First U.N. Int'l. Conf. Peaceful Uses of Atomic Energy*, vol. VIII, pp. 77-80, (1955), Geneva.

Busev et al., "Practical Guide for the Analytical Chemistry of Rare Elements", pp. 113, 381-383, (1966), Moskow.

*Primary Examiner*—Edward A. Miller
*Attorney, Agent, or Firm*—Fleit, Jacobson, Cohn & Price

[57] ABSTRACT

A process is described for the recovery of tetravalent uranium from wet-process phosphoric acid utilizing an alkyl pyrophosphoric acid extractant or the like. After extracting the tetravalent uranium from wet-process acid, iron is stripped from the pregnant extractant into an oxalic acid stripping solution and then the tetravalent uranium is stripped from the pregnant extractant into an oxalate stripping solution. The oxalate stripping solution is an aqueous solution of an alkali metal or ammonium oxalate. The barren extractant is recycled for contacting with fresh wet-process acid. The uranium is oxidized and then precipitated in the oxalate stripping solution. The precipitated solids are separated from the solution, and the uranium is dried to a $UO_3$ product.

23 Claims, 1 Drawing Figure

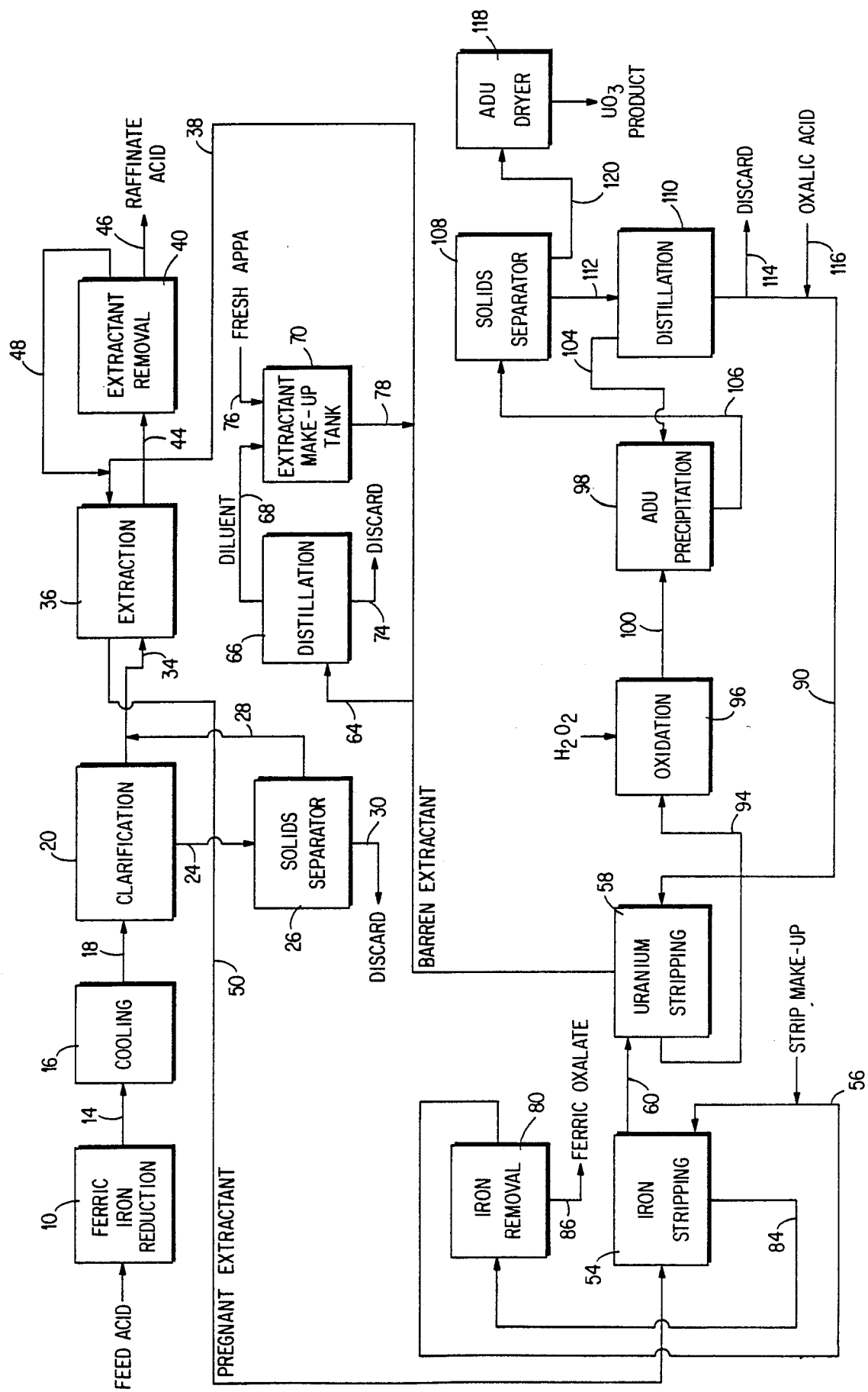

PROCESS FOR STRIPPING URANIUM FROM AN ALKYL PYROPHOSPHORIC ACID

BACKGROUND OF THE INVENTION

Minable phosphate is found in a number of places throughout the world, and in many of these deposits small quantities of uranium are found complexed with the phosphate values. The large phosphate deposit in central Florida, for example, contains from 0.01 to 0.02 weight percent uranium. This uranium is taken into solution when the phosphate is acidulated with mineral acid to produce wet-process phosphoric acid.

The early work on the recovery of uranium from wet-process acid is described in a publication referred to as DOW-81 and entitled "Recovery of Uranium from Industrial Phosphoric Acid by Solvent Extraction". Alkyl pyrophosphoric acid was found to be very efficient in selectively extracting uranium from phosphoric acid and several flow sheets utilizing this type of extractant are shown in U.S. Pat. No. 2,866,680. Prior processes for recovering uranium using a pyrophosphoric acid extractant include processes in which uranium is stripped from the extractant into an acidic stripping solution. It is also known to strip uranium from the extractant into an alkaline stripping solution.

It is an object of the present invention to provide an improved process for recovering tetravalent uranium from wet-process phosphoric acid using an extractant such as an alkyl pyrophosphoric acid and an acidic stripping solution.

A further object of the present invention is to provide an improved process for recovering uranium from wet-process acid in which uranium is stripped in the tetravalent state from an extractant such as an alkyl pyrophosphoric acid into an acidic stripping solution.

Still a further object of the present invention is to provide a process for recovering tetravalent uranium from wet-process phosphoric acid using an alkyl pyrophosphoric acid extractant and acidic stripping solution in which the pyrophosphoric acid esters remain dissolved in the extractant solution during stripping.

Yet a further object of the present invention is to provide a process for recovering tetravalent uranium from wet-process acid including means for handling any ferric iron which may be present in the pregnant extractant.

A still further object of the present invention is to provide a process for recovering tetravalent uranium from wet-process acid which is economical and minimizes consumption of costly reagents.

SUMMARY OF THE INVENTION

In accordance with the present invention, uranium is stripped in the tetravalent state from an organic extractant having a high affinity for tetravalent uranium such as an alkyl pyrophosphoric acid. The stripping solution comprises an aqueous solution of an alkali metal or ammonium oxalate such as an aqueous solution of ammonium oxalate. During contact between the oxalate stripping solution and the pregnant organic extractant, uranium is stripped from the extractant into the stripping solution.

Ferric iron is typically extracted into the organic extractant during contact with the wet-process phosphoric acid even when reduced acid is employed. A portion of this ferric iron is stripped from the pregnant extractant prior to uranium stripping with an oxalic acid stripping solution. The iron is removed from the stripping solution by heating the solution to drive off water and then separating ferric oxalate from the solution.

After separating the uranium stripping solution from the barren organic extractant, the uranium in the stripping solution is oxidized to the hexavalent state with an oxidizing agent such as hydrogen peroxide. The uranium is precipitated, separated from the stripping solution and dried to yield a high-grade uranium-containing product.

BRIEF DESCRIPTION OF THE DRAWINGS

The FIGURE is a schematic flow sheet illustrating the recovery of uranium from wet-process phosphoric acid.

DESCRIPTION OF THE PREFERRED EMBODIMENTS

Wet-process phosphoric acid is obtained by the acidulation of uncalcined phosphate rock with sulfuric acid and can contain about 20 to 55% $P_2O_5$ by weight, more typically about 25 to 50% $P_2O_5$. Wet-process acid normally contains about 28 to 32% $P_2O_5$ by weight, but can typically contain about 40 to 45% $P_2O_5$ if produced by the hemi-hydrate process. The wet-process acid is treated so that ferric iron in the acid is reduced to the ferrous state. Since the oxidation state of the iron tends to control the oxidation state of the uranium, substantially all of the uranium will be in the reduced tetravalent state even at relatively high ferric iron concentrations. However, to minimize ferric iron interference with extraction and stripping, the ferric iron should be reduced such that the ferric iron concentration is at least about 8 g/l or below, preferably at least about 4 g/l or below.

The manner in which the ferric iron is reduced is not critical. The ferric iron can be reduced using a chemical reductant such as iron metal, silicon metal, or an iron-silicon alloy commonly referred to in the art as a ferrosilicon alloy having a silicon content from about 5 to 100% by weight, preferably about 5 to 80% by weight, and most preferably about 5 to 20% by weight. The ferric iron also can be reduced using electrolytic reduction. In the reduction step, $Fe^{+3}$ is reduced to $Fe^{+2}$ and any $U^{+6}$ to $U^{+4}$. As indicated above, it is not necessary that all of the $Fe^{+3}$ be reduced to the lower valence state in order to effectively extract the uranium from wet-process acid. Thus, the extent to which the ferric iron concentration in the wet-process acid is reduced is a question of economics based on the overall uranium recovery process.

The reduced wet-process acid is cooled using any conventional technique such as cooling water or an evaporator. The temperature of the wet-process acid is typically about 60° to 80° C. It is preferred to cool the acid to about 55° C. or below, more preferably about 30° to 50° C. Cooling the acid increases the extraction coefficient during extraction and improves the uranium recovery process. Again, however, the extent to which the acid is cooled, if any, is a question of economics based on the overall uranium recovery process.

The cooled wet-process acid is clarified to at least partially remove inorganic solids such as calcium sulfate (gypsum) and organic solids such as humics. There are several techniques known in the art for clarifying wet-process acid and any of these techniques can be employed. For example, a rake tank classifier or Lamella clarifier can be employed to clarify the acid. The clarification step may employ a separate solids separation unit. Preferably, the clarified acid is then passed through a polishing filter to reduce the solids concentration to about 20 parts per million (ppm) or less.

The tetravalent uranium in the clarified acid is extracted with an extractant having a high affinity for tetravalent uranium, preferably an alkyl pyrophosphoric acid (APPA). The various APPA extractants that can be used include those disclosed in U.S. Pat. No. 2,866,680. The APPA extractants are the reaction product of phosphoric oxide and an alcohol which typically has a chain length of from 4 to 20 carbon atoms, preferably from 6 to 12 carbon atoms. The reaction product is a complex mixture as indicated by "Products of the Reaction Between Alcohols and Phosphorus Pentaoxide: Identity and Extraction Efficiency of the Various Products", M. Zangen, Y. Marcus and E. D. Bergmann, *Separation Science*, (2), pp. 187–197, 1967. Methods for preparing the APPA extractants are disclosed in U.S. Pat. Nos. 2,866,680 and 2,947,774, the disclosures of which are expressly incorporated herein by reference. It is preferred to form the APPA extractants using essentially the method disclosed in U.S. Pat. No. 2,947,774.

The APPA extractant is dissolved in an essentially water-immiscible organic diluent. Suitable diluents include, for example, aliphatic hydrocarbons, petroleum fractions low in aromatics, and chlorinated hydrocarbons. The preferred diluents are refined high-boiling, high-flash point petroleum fractions containing between 10 and 50% by volume naphthenes with the balance being principally aliphatic.

The APPA concentration in the extractant solution is generally about 10 to 100 g/l. The concentration of APPA in the extractant solution which is used in practice will be determined by various factors in the overall process such as the ferric iron concentration in the wet-process acid and the temperature to which the acid is cooled.

The extraction can be accomplished in a batch operation or in a continuous manner concurrently or countercurrently with countercurrent flow preferred. Apparatus for accomplishing intermixing and separation of two substantially immiscible phases are well-known in the art and any conventional apparatus can be used for this purpose. It is preferred to operate the extraction in the aqueous continuous mode using a 3 to 8 stage, preferably 5 to 8 stage, countercurrent uranium extraction unit. In general, the volume ratio of the wet-process acid to the extractant solution during extraction should be between about 1:1 and 10:1.

After extraction, the wet-process acid is returned to the acid producer for additional processing to make "merchant acid", which is either sold or used to manufacture a variety of products, chiefly fertilizers. Preferably, any extractant entrained in the wet-process acid during extraction is removed from the wet-process acid before the acid is returned to the acid producer. The entrained extractant can be removed by any conventional technique including the use of one or more flotation cells.

The extractant is stripped of its iron content by contacting the extractant with an oxalic acid stripping solution. In general, the pH of the oxalic acid stripping solution should be about 1.5 to 2, preferably about 1.5 to 1.8. A 1 M oxalic acid solution has a pH of 1.5. The temperature in this stripping stage will normally be about the same as the temperature to which the acid is cooled prior to extraction.

The iron stripping can be accomplished in a batch operation or in a continuous manner concurrently or countercurrently with countercurrent flow preferred. It is preferred to operate the iron stripping in the organic continuous mode using a 2 to 5 stage, preferably 3 stage, countercurrent stripping unit. In general, the volume ratio of the oxalic acid stripping solution to the extractant solution during stripping should be between about 1:10 and 1:1, preferably about 1:4.

The iron is removed from the oxalic acid stripping solution by heating the solution to drive off water. The ferric oxalate precipitate is then separated from the stripping solution in a solids separator such as a centrifuge or filter. The oxalic acid stripping solution is recycled for contact with fresh pregnant extractant. Make-up stripping solution is added to the recycled stream.

In the next step of the process, the extractant is stripped of its uranium content by contacting the extractant with an oxalate stripping solution. The oxalate stripping solution is an aqueous solution of an alkali metal or ammonium oxalate. The preferred stripping solution is an ammonium oxalate solution. The terminology "oxalate" also is intended to encompass bioxalate.

In general, the pH of the oxalate stripping solution should be above about 3.5, preferably above about 5, and more preferably about 5 to 5.5. For example, if an ammonium oxalate solution is used, it should preferably be about 0.5 to 3 M, more preferably about 1 M. The temperature in this stripping stage will normally be about the same as the temperature to which the acid is cooled prior to extraction.

The uranium stripping can be accomplished in a batch operation or a continuous manner concurrently or countercurrently with countercurrent flow preferred. It is preferred to operate the uranium stripping in the organic continuous mode using a 2 to 5 stage, preferably 3 stage, countercurrent uranium stripping unit. In general, the volume ratio of the oxalate stripping solution to the extractant solution during stripping should be between about 1:10 and 1:1, preferably between about 1:2 and 1:5.

The barren extractant is recycled for contact with fresh wet-process acid. Prior to contact with the acid, however, a portion of the recycled barren extractant is removed as a bleed stream. The bleed stream is passed through a distillation column or the like or scrubbed with an alkaline solution to separate the diluent contained in the bleed stream from the APPA and decomposition products such as orthoesters. The diluent is then combined with fresh APPA extractant and fed back into the recycled barren extractant stream.

The volume of the bleed stream, which is typically about 5 to 15% of the recycled barren organic extractant stream, is based on the quantity of fresh APPA required to be added to keep the APPA concentration in the extraction solution approximately the same. The APPA concentration of the fresh extractant is typically about 20 to 1000 g/l, preferably about 400 to 600 g/l. The volume of fresh extractant fed back, after dilution with recovered diluent, into the recycled barren extractant stream will be substantially the same as the volume of extractant solution removed in the bleed stream.

The recycled barren extractant stream may, if desired, be acidulated with mineral acid such as phosphoric acid prior to being recontacted with wet-process acid in extraction. The acidulation converts the APPA extractant from its salt form (e.g., ammonium form) to its acid form. Otherwise, the extractant will be acidified during the first stages of contact with the wet-process acid.

The uranium in the oxalate stripping solution is oxidized and the uranium converted from the tetravalent state to the hexavalent state in the stripping solution. The preferred oxidizing agent is hydrogen peroxide; however, other oxidizing agents such as sodium chlorate, oxygen, or air could be employed. The hydrogen peroxide is preferably added to the stripping solution as an about 25 to 50% by volume aqueous solution. The amount of oxidizing agent added should be in excess of the stoichiometric amount required to oxidize the uranium content of the stripping solution to the +6 state ($UO_2^{++}$).

In the next step of the process, the oxalate stripping solution is treated to cause the uranium to precipitate as ammonium diuranate (ADU). The pH of the stripping solution prior to the precipitation step is about 3 to 5, preferably about 5. The pH is adjusted during the precipitation step to at least about 9. This is accomplished, for example, by adding recycled ammonia to the stripping solution. The particular pH involved will depend on the ammonia concentration.

The oxalate stripping solution is fed to a conventional solids separator such as a centrifuge or filter. The precipitate is separated from the oxalate stripping solution in the solids separator. The oxalate stripping solution is recycled, and the uranium precipitate dried in a conventional dryer which is preferably indirectly fired.

The recycled oxalate stripping solution is passed through a distillation column or the like to separate ammonia from the stripping solution. The ammonia is recycled to the precipitation unit to adjust the pH. The pH of the oxalate stripping solution leaving the distillation column or the like is about 6 to 8, preferably about 6.5.

Prior to contact with the pregnant extractant, a portion of the recycled oxalate stripping solution is removed as a bleed stream. Subsequently, make-up oxalic acid solution and any necessary make-up ammonia is added to the recycled stream in sufficient quantity and concentration to adjust the pH of the solution to preferably about 5 to 5.5 and to maintain the concentration of the stripping solution in the desired range.

In order to facilitate an easier understanding of the uranium recovery stages of the present invention, a flow sheet illustrating the process is provided in the FIGURE. Wet-process phosphoric acid is introduced into ferric iron reduction unit 10 and the ferric iron concentration reduced. The reduced wet-process acid is introduced via line 14 into cooling unit 16 in which the acid is cooled. After cooling, the acid is fed via line 18 to clarification unit 20. The solids separated in clarification unit 20 are fed via line 24 to solids separator 26. In the separator 26, residual acid is separated from the solids and recycled to extraction via line 28. The separated solids are fed to disposal via line 30.

The clarified acid is introduced via line 34 into a countercurrent uranium extraction unit 36, while an APPA extractant solution is introduced into the unit via recycle line 38. After extraction, the raffinate acid is fed to extractant removal unit 40 via line 44. The raffinate acid is returned to the acid producer via line 46 to be evaporated into "merchant acid". The extractant removed from the raffinate acid in extractant removal unit 40 is recycled to extraction via line 48.

The extractant, now rich in uranium, is fed via line 50 to iron stripping unit 54, while an oxalic acid stripping solution is introduced into the unit via recycle line 56. After being stripped of its iron content, the extractant from iron stripping unit 54 is fed to uranium stripping unit 58 via line 60 and is then recycled to uranium extraction unit 36 via recycle line 38.

A portion of the recycled barren extractant is removed from recycle line 38 via bleed line 64 and fed to distillation unit 66. The overhead from the distillation unit 66, principally diluent, is fed via line 68 to extractant make-up tank 70, while the bottoms from the distillation unit 66, principally APPA extractant and hydrolysis products, are fed to discard via line 74. Fresh APPA is introduced into extractant make-up tank 70 via line 76 and the resulting fresh extractant solution introduced into recycle line 38 via line 78.

The oxalic acid stripping solution from iron stripping unit 54 is fed to iron removal unit 80 via line 84. The iron is removed from the stripping solution by heating the solution to drive off water and then separating ferric oxalate solids via line 86. Stripping solution makeup is added to recycle line 56 via line 88.

The ammonium oxalate stripping solution is introduced into uranium stripping unit 58 via recycle line 90. The ammonium oxalate stripping solution from uranium stripping unit 58 is fed via line 94 to oxidation unit 96 and then introduced into ADU (ammonium diuranate) precipitation unit 98 via line 100, while ammonia is introduced into the unit via recycle line 104. The ammonium oxalate stripping solution from precipitator 98 is fed via line 106 to solids separator 108. The ammonium oxalate stripping solution from solids separator 108 is fed to distillation unit 110 via line 112. A portion of the recycled stripping solution is removed from recycle line 90 via bleed line 114 and fed to discard or recovery. Oxalic acid solution make-up is fed to the stripping solution recycled to contact fresh pregnant extractant via line 116. The ADU solids separated in solids separator 108 are introduced into ADU dryer unit 118 via line 120. The ADU solids are dried in ADU drier unit 118 to yield a high-grade $UO_3$ product.

To facilitate a better understanding of the advantages and operation of the present invention, the following examples are provided.

EXAMPLE 1

A barren extractant solution containing 30 g/l isodecyl pyrophosphoric acid in a kerosene diluent was contacted in a series of three sequential batch shakeouts with wet-process phosphoric acid. The first contact of the extractant solution with the wet-process acid was at an aqueous to organic ratio of 3:1, the second contact was at an aqueous to organic ratio of 5:1 and the third contact at an aqueous to organic ratio of 7:1. Each of the contacts were standard batch shakeouts at 55° C. of 5 minutes' duration. Fresh wet-process phosphoric acid was used in each contact. The wet-process acid contained 165 mg/l total uranium, 3 g/l ferric iron and 29% $P_2O_5$ by weight. The uranium concentrations of the raffinate acids from the third, second and first contacts were 0.115 g/l, 0.082 g/l and 0.032 g/l, respectively. The pregnant extractant contained 1.175 g/l total uranium and 0.9 g/l ferric iron.

The pregnant extractant was contacted in a series of two sequential batch shakeouts with a 1 molar aqueous solution of oxalic acid having a pH of 1.8. The first contact of the pregnant extractant with the oxalic acid solution was at an organic to aqueous ratio of 10:1 and the second contact was at an organic to aqueous ratio of 5:1. Each of the contacts were standard batch shakeouts at 65° C. of 5 minutes' duration. Fresh oxalic acid solution was used in each contact. The ferric iron concentration of the pregnant extractant after contact with the oxalic acid solution was 0.15 g/l.

The pregnant extractant was then contacted in a series of three sequential batch shakeouts with a 1 molar aqueous solution of ammonium oxalate having a pH of 3.8. The contacts were all at an organic to aqueous ratio of 4:1. Each of the contacts were standard batch shakeouts at 65° C. of 5 minutes' duration. Fresh ammonium oxalate solution was used in each contact. The uranium concentrations of the ammonium oxalate solutions from the first, second and third contacts of the pregnant extractant with the ammonium oxalate solutions were 3.224 g/l, 0.924 g/l and 0.215 g/l, respectively. The uranium concentration of the barren extractant after the final (third) contact with the ammonium oxalate solutions was 0.066 g/l.

EXAMPLE 2

The process described in Example 1 was repeated except that the wet-process acid contained 179 mg/l total uranium. The uranium concentrations of the raffinate acids from the third, second and first contacts were 0.171 g/l, 0.133 g/l and 0.058 g/l, respectively. The pregnant extractant contained 0.9 g/l total uranium and 1.0 g/l ferric iron. The ferric iron concentration of the pregnant extractant after contact with the oxalic acid solution was 0.15 g/l. The uranium concentrations of the ammonium oxalate solutions from the first, second and third contacts of the pregnant extractant with the ammonium oxalate solutions were 0.3813 g/l, 0.439 g/l and 0.061 g/l, respectively. The uranium concentration of the barren extractant after the final (third) contact with the ammonium oxalate solutions was 0.026 g/l.

EXAMPLE 3

A pregnant extractant solution containing 30 g/l isodecyl pyrophosphoric acid in a kerosene diluent, a total uranium concentration of 1.113 g/l and a ferric iron concentration of 0.7 g/l was contacted in a series of four sequential batch shakeouts with a 1 molar aqueous solution of oxalic acid having a pH of 1.7. The first contact of the pregnant extractant with the oxalic acid solution was at an organic to aqueous ratio of 2:1, the second contact was at an organic to aqueous ratio of 4:1, the third contact was at an organic to aqueous ratio of 6:1 and the fourth contact was at an organic to aqueous ratio of 10:1. Each of the contacts were standard batch shakeouts at 50° C. of 5 minutes' duration. Fresh oxalic acid solution was used in each contact. The ferric iron concentration of the pregnant extractant after contact with the oxalic acid solution was 0.2 g/l.

The pregnant extractant was then contacted in a series of three sequential batch shakeouts with a 1 molar aqueous solution of ammonium oxalate having a pH of 5. The contacts were all at an organic to aqueous ratio of 4:1. Each of the contacts were standard batch shakeouts at 65° C. of 5 minutes' duration. Fresh ammonium oxalate solution was used in each contact. The uranium concentrations of the ammonium oxalate solutions from the first, second, third and fourth contacts of the pregnant extractant with the ammonium oxalate solutions were 3.774 g/l, 1.82 g/l, 1.342 g/l and 0.986 g/l, respectively. The uranium concentration of the barren extractant after the final (fourth) contact with the ammonium oxalate solutions was 0.116 g/l.

As will be readily understood by those of ordinary skill in the art, minor modifications may be made in the process described above without in any way departing from the spirit and scope of the invention. Accordingly, it is understood that the invention will not be limited to the exact details disclosed hereinbefore, but will be defined in accordance with the appended claims.

We claim:

1. A process for stripping uranium from a pregnant organic extractant comprising an extractant having a high affinity for tetravalent uranium dissolved in a substantially water-immiscible organic diluent, said organic extractant containing tetravalent uranium, comprising stripping said organic extractant with a stripping solution comprising an aqueous solution of an alkali metal or ammonium oxalate to strip tetravalent uranium from said organic extractant into said stripping solution, and separating said organic extractant from said stripping solution containing stripped tetravalent uranium.

2. The process of claim 1 in which said extractant is an alkyl pyrophosphoric acid which is a reaction product of phosphoric oxide and an alcohol containing 4 to 20 carbon atoms.

3. The process of claim 2 wherein said alcohol contains 6 to 12 carbon atoms.

4. The process of claim 2 in which said organic extractant contains about 10 to 100 g/l of said alkyl pyrophosphoric acid.

5. The process of claim 1 in which said stripping solution is an aqueous ammonium oxalate solution.

6. The process of claim 1 in which said stripping solution has a pH of above about 5.

7. The process of claim 6 in which said pH is about 5 to 5.5.

8. A process for stripping uranium from an organic extractant comprising an alkyl pyrophosphoric acid dissolved in an essentially water-immiscible organic diluent, said organic extractant containing tetravalent uranium and ferric iron, stripping said organic extractant with an oxalic acid stripping solution to strip ferric iron from said organic extractant into said oxalic acid stripping solution, and stripping said organic extractant with an alkali metal or ammonium oxalate stripping solution to strip tetravalent uranium from said organic extractant into said oxalate stripping solution.

9. The process of claim 8 in which said alkyl pyrophosphoric acid is a reaction product of phosphoric oxide and an alcohol containing 4 to 20 carbon atoms.

10. The process of claim 9 in which said alcohol contains 6 to 12 carbon atoms.

11. The process of claim 8 in which said organic extractant contains about 10 to 100 g/l of said alkyl pyrophosphoric acid.

12. The process of claim 8 in which said oxalate stripping solution is an aqueous ammonium oxalate solution.

13. The process of claim 8 in which the pH of said oxalic acid stripping solution is about 1.5 to 2.

14. The process of claim 8 in which the pH of said oxalate stripping solution is about 5 to 5.5.

15. A process for recovering uranium from wet-process phosphoric acid comprising contacting wet-process phosphoric acid containing tetravalent uranium with an organic extractant to extract said tetravalent uranium from said wet-process phosphoric acid, said organic extractant comprising an alkyl pyrophosphoric acid dissolved in an essentially water-immiscible organic diluent, separating said organic extractant containing said tetravalent uranium from said wet-process phosphoric acid, contacting said pregnant organic extractant with a first stripping solution comprising an aqueous solution of oxalic acid to strip iron from said pregnant organic extractant into said first stripping solution, contacting said pregnant organic extractant with a second stripping solution comprising an aqueous solution of an alkali metal or ammonium oxalate to strip uranium from said pregnant organic extractant into said stripping solution, and recycling barren organic extractant for contacting with fresh wet-process phosphoric acid.

16. The process of claim 15 in which a portion of said recycled barren organic extractant is treated to separate diluent from the remainder of said organic extractant, fresh alkyl pyrophosphoric acid is added to said separated diluent to form fresh organic extractant, and said fresh organic extractant is added to said recycled barren organic extractant.

17. The process of claim 16 in which said diluent is separated by distillation.

18. The process of claim 15 in which said recycled barren organic extractant is reacidulated with a mineral acid.

19. The process of claim 15 in which said stripped uranium is precipitated in said oxalate stripping solution, said precipitate is separated from said stripping solution, and said stripping solution is recycled for contact with pregnant organic extractant.

20. The process of claim 19 in said said precipitated uranium is dried to form a final $UO_3$ product.

21. A process for recovering uranium from wet-process phosphoric acid comprising contacting wet-process phosphoric acid containing tetravalent uranium with an organic extractant to extract said tetravalent uranium from said wet-process phosphoric acid, said organic extractant comprising an alkyl pyrophosphoric acid dissolved in an essentially water-immiscible organic diluent, contacting said pregnant organic extractant with a stripping solution comprising an aqueous solution of an alkali metal or ammonium oxalate to strip uranium from said pregnant organic extractant into said stripping solution, separating said organic extractant containing said alkyl pyrophosphoric acid from said stripping solution containing said stripped uranium, recycling barren organic extractant for contacting with fresh wet-process phosphoric acid, treating a portion of said recycled barren organic extractant to separate diluent from the remainder of said organic extractant, adding fresh alkyl pyrophosphoric acid to said separated diluent to form fresh organic extractant, adding said fresh organic extractant to said recycled barren organic extractant, separating said uranium from said stripping solution by precipitation, and recycling said stripping solution for contacting with fresh organic extractant.

22. The process of claim 21 in which said pregnant organic extractant is stripped with an oxalic acid stripping solution to strip ferric iron from said organic extractant.

23. The process of claim 21 in which said precipitated uranium is dried to form a final $UO_3$ product.

* * * * *